(12) United States Patent
Kupfernagel et al.

(10) Patent No.: US 11,275,160 B2
(45) Date of Patent: Mar. 15, 2022

(54) ULTRASONIC SENSOR DEVICE FOR A MOTOR VEHICLE HAVING A TWO-PART ATTACHMENT DEVICE, PANELING ARRANGEMENT, MOTOR VEHICLE AND METHOD

(71) Applicant: VALEO Schalter und Sensoren GmbH, Bietigheim-Bissingen (DE)

(72) Inventors: Uwe Kupfernagel, Bietigheim-Bissingen (DE); Oliver Eidel, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 690 days.

(21) Appl. No.: 15/750,991

(22) PCT Filed: Aug. 11, 2016

(86) PCT No.: PCT/EP2016/069128
§ 371 (c)(1),
(2) Date: Feb. 7, 2018

(87) PCT Pub. No.: WO2017/025596
PCT Pub. Date: Feb. 16, 2017

(65) Prior Publication Data
US 2018/0239006 A1 Aug. 23, 2018

(30) Foreign Application Priority Data
Aug. 11, 2015 (DE) ............... 10 2015 113 192.7

(51) Int. Cl.
*G01S 7/521* (2006.01)
*G01S 15/931* (2020.01)
(Continued)

(52) U.S. Cl.
CPC ............ *G01S 7/521* (2013.01); *B60R 19/483* (2013.01); *G01S 15/931* (2013.01); *G10K 11/004* (2013.01); *G01S 2015/938* (2013.01)

(58) Field of Classification Search
CPC ........ G01S 7/521; G01S 15/93; G01S 15/931; G01S 2015/938; B60R 19/48; B60R 19/483; G10K 11/00; G10K 11/004
See application file for complete search history.

(56) References Cited

U.S. PATENT DOCUMENTS 8,970,093 B2* 3/2015 Swett .................. E21B 47/01
310/348
8,988,971 B2* 3/2015 Mueller .................. G10K 9/22
367/140
(Continued)

FOREIGN PATENT DOCUMENTS

CN 101038338 A 9/2007
CN 203396948 U 1/2014
(Continued)

OTHER PUBLICATIONS

Notification of Reason for Rejection in corresponding Japanese Application No. 2018-506900, dated Mar. 1, 2019 (8 pages).
(Continued)

*Primary Examiner* — Isam A Alsomiri
*Assistant Examiner* — Amie M Ndure
(74) *Attorney, Agent, or Firm* — Osha Bergman Watanabe & Burton LLP

(57) ABSTRACT

The invention relates to an ultrasonic sensor device (2) for a motor vehicle, having an ultrasonic sensor (3) which has a diaphragm (8) for emitting and/or receiving an ultrasonic signal, and having an attachment device which is configured, in a correct installation position of the ultrasonic sensor device (2) on an exterior panelling part (6) of the motor vehicle, to press the diaphragm (8) against an inner side (7)
(Continued)

of the exterior panelling part (6) with a prestressing force, wherein the attachment device has a securing apparatus (5) and a cover apparatus (4), wherein the securing apparatus (5) can be arranged on the inner side (7) of the exterior panelling part (6) and has an opening (22) in which the diaphragm (8) is arranged, and wherein the cover apparatus (4) has a receptacle (24) in which a rear side (23), lying opposite the diaphragm (8), of the ultrasonic sensor (3) is secured, and wherein the cover apparatus (4) and the securing apparatus (5) are connected in a positively locking fashion.

12 Claims, 3 Drawing Sheets

(51) Int. Cl.
*B60R 19/48* (2006.01)
*G10K 11/00* (2006.01)

(56) References Cited

U.S. PATENT DOCUMENTS

| | | | | |
|---|---|---|---|---|
| 9,239,337 | B2 * | 1/2016 | Mueller | G01F 1/662 |
| 9,400,327 | B2 * | 7/2016 | Kupfernagel | G10K 9/22 |
| 9,910,142 | B2 * | 3/2018 | Wehling | H04R 1/021 |
| 10,097,062 | B2 * | 10/2018 | Guntermann | H02K 5/225 |
| 2007/0062292 | A1 | 3/2007 | Sato et al. | |
| 2009/0013782 | A1 * | 1/2009 | Theml | B60R 19/483 73/431 |
| 2011/0314933 | A1 * | 12/2011 | Mueller | G10K 11/004 73/861.18 |
| 2012/0180569 | A1 | 7/2012 | Inoue et al. | |
| 2014/0346303 | A1 | 11/2014 | Hirakawa et al. | |
| 2015/0198698 | A1 * | 7/2015 | Wehling | G01S 7/521 73/632 |

FOREIGN PATENT DOCUMENTS

| | | | | |
|---|---|---|---|---|
| CN | 104175955 A | 12/2014 | | |
| CN | 104662438 A | 5/2015 | | |
| DE | 10 2004 020 426 A1 | 11/2005 | | |
| DE | 10 2006 007710 A1 | 8/2007 | | |
| DE | 10 2010 034260 A1 | 2/2012 | | |
| DE | 10 2010 034491 A1 | 2/2012 | | |
| DE | 102010034491 A1 * | 2/2012 | | G01D 11/30 |
| DE | 10 2010 049 818 A1 | 5/2012 | | |
| DE | 102010049818 A1 * | 5/2012 | | G01S 2015/938 |
| DE | 10 2015 212 599 B3 | 6/2016 | | |
| EP | 1 577 169 A1 | 9/2005 | | |
| JP | 2007-114182 A | 5/2007 | | |
| JP | 2013-221880 A | 10/2013 | | |
| JP | 2014-227090 A | 12/2014 | | |
| JP | 2015-087219 A | 5/2015 | | |
| WO | 2011/089644 A1 | 7/2011 | | |
| WO | 2017/005448 A1 | 1/2017 | | |

OTHER PUBLICATIONS

International Search Report issued in PCT/EP2016/069128 dated Nov. 2, 2016 (3 pages).
Written Opinion of the International Searching Authority issued in PCT/EP2016/069128 dated Nov. 2, 2016 (8 pages).
German Search Report issued in DE 10 2015 113 192.7 dated Jul. 27, 2016 (12 pages).
The Final Notice of Preliminary Rejection issued in corresponding Korean Application No. 10-2018-7004124, dated Dec. 22, 2019 (14 pages).
Office Action issued in corresponding European Application No. 16753334.8, dated Feb. 4, 2020 (8 pages).
The First Office Action issued in corresponding Chinese Application No. 201680047414 7, dated Jan. 4, 2021 (18 pages).

* cited by examiner

ULTRASONIC SENSOR DEVICE FOR A MOTOR VEHICLE HAVING A TWO-PART ATTACHMENT DEVICE, PANELING ARRANGEMENT, MOTOR VEHICLE AND METHOD

The present invention relates to an ultrasonic sensor device for a motor vehicle having an ultrasonic sensor which has a diaphragm for emitting and/or receiving an ultrasonic signal, and having an attachment device which is configured, in a correct installation position of the ultrasonic sensor device on an exterior panelling part of the motor vehicle, to press the diaphragm against an inner side of the exterior panelling part with a prestressing force. The invention also relates to a panelling arrangement having an ultrasonic sensor device and an exterior panelling part. Furthermore, the present invention relates to a motor vehicle having such a panelling arrangement. Finally, the present invention relates to a method for mounting an ultrasonic sensor device on an exterior panelling part of a motor vehicle.

The focus here is in particular on ultrasonic sensor devices for motor vehicles. Such an ultrasonic sensor device comprises an ultrasonic sensor with which an object in the surroundings of the motor vehicle can be detected. For this purpose, the ultrasonic sensor emits an ultrasonic signal. The ultrasonic signal which is reflected by the object can also be received with the ultrasonic sensor. The distance from the object can be determined on the basis of the transit time of the ultrasonic signal. Such ultrasonic sensor devices or ultrasonic sensors can be, for example, part of a parking assistance system which assists the driver during a parking process.

It is known here that the ultrasonic sensors are arranged, for example, in corresponding openings in exterior panelling parts of the motor vehicle. For example, the ultrasonic sensors can be arranged in corresponding openings in the bumpers of the motor vehicle. Furthermore, ultrasonic sensor devices are known in which the ultrasonic sensors are arranged concealed behind the bumper. In this case, the ultrasonic sensors emit the ultrasonic signal through the exterior panelling part and receive the reflected ultrasonic signal through the exterior panelling part.

In this respect, DE 10 2010 049 818 A1 discloses an arrangement having an exterior panelling element for a vehicle and having at least one sensor which is positioned concealed on the exterior panelling element behind a wall which does not adversely affect the detection function of the sensor. In this context, the sensor is pressed, via a securing device connected to the exterior panelling element, against the wall with a prestressing force in such a way that it is held in position in a frictionally locking fashion with the wall.

Furthermore, it is known from the prior art to use what are referred to as door opening assistants in motor vehicles. In this context, for example it is possible to use the ultrasonic sensor device to check whether an object is in an opening region of a door. If an object is present in the opening region, the movement of the door during the opening process can be limited with a limiting apparatus. Alternatively or additionally, a corresponding warning signal can be output to the driver or to another vehicle occupant of the motor vehicle who would like to exit the motor vehicle. In this way, it is possible to prevent the door from colliding with the object during the opening process.

When the ultrasonic sensor device is applied in a door opening assistant, the ultrasonic sensors are installed in the doors of the motor vehicle. In this context, the ultrasonic sensors are bonded to an inner side of the exterior panelling part or of the exterior panel. In order to mount them at the corresponding sensor positions, the sensors must be guided through relatively small cutouts in the inner panel. In this context, the ultrasonic sensor is usually mounted in three working steps. Firstly, a security device is bonded onto the exterior panelling part. Subsequently, the ultrasonic sensor is introduced into the securing apparatus and bonded to the door. Finally, a cover apparatus can be securing applied to the unit composed of the securing apparatus and ultrasonic sensor. This cover apparatus applies a prestressing force to the ultrasonic sensor in the direction of the outside of the vehicle here. This prestressing force presses the ultrasonic sensor onto the inner side of the exterior panelling part or of the door panel, and the bonding can be cured under the prestressing force or the contact pressure force. Such mounting has, however, the disadvantage that the individual parts usually have to be guided through small openings in the door inner panel. This leads to a situation in which the mounting is time-consuming and complex.

An object of the present invention is to disclose a solution enabling an ultrasonic sensor device of the type mentioned at the beginning to be mounted easily and cost-effectively on the exterior panelling part.

This object is achieved according to the invention by means of an ultrasonic sensor device, by means of a panel arrangement, by means of a motor vehicle and by means of a method having the features according to the respective independent patent claims. Advantageous embodiments of the invention are the subject matter of the dependent patent claims, of the description and of the figures.

An ultrasonic sensor device according to the invention for a motor vehicle comprises an ultrasonic sensor which has a diaphragm for emitting and/or receiving an ultrasonic signal. Furthermore, the ultrasonic sensor device has an attachment device which is configured, in a correct installation position of the ultrasonic sensor device on the exterior panelling part of the motor vehicle, to press the diaphragm against an inner side of the exterior panelling part with a prestressing force. The attachment device has a securing apparatus and a cover apparatus. In this context, the securing apparatus can be arranged on the inner side of the exterior panelling part and has an opening in which the diaphragm is arranged. The cover apparatus has a receptacle in which a rear side, lying opposite the diaphragm, of the ultrasonic sensor is secured. In addition, the cover apparatus and the securing apparatus are connected in a positively locking fashion.

The ultrasonic sensor device comprises an ultrasonic sensor which can have, for example, a pot-shaped diaphragm. The pot-shaped diaphragm can be formed, in particular, from aluminium. A floor surface, different from the lateral surface, of the diaphragm can serve as an emission surface for an ultrasonic signal. For this purpose, the diaphragm or the floor surface can be excited to undergo mechanical oscillations with a piezo-element. In the same way, the ultrasonic signals which are reflected by an object in the surroundings of the motor vehicle can be received with the diaphragm. The diaphragm is excited here to undergo mechanical oscillations by the ultrasonic signal reflected by the object. These mechanical oscillations can be detected with the piezo element. The distance between the ultrasonic sensor and the object can be determined on the basis of the transit time between the emission of the ultrasonic signal and the reception of the ultrasonic signal reflected by the object. In the correct installation position, the ultrasonic sensor is arranged concealed behind the exterior panelling part of the motor vehicle by means of the attachment device. The exterior panelling part can be, for example, a bumper. The exterior panelling part is preferably a part of a door of a motor vehicle, for example a door panel. The ultrasonic sensor device can be part of a door assistant of the motor vehicle.

The attachment device by means of which the ultrasonic sensor is bonded to the inner side of the exterior panelling part under prestress is embodied here in two parts. The attachment device has a securing apparatus and cover apparatus. When the ultrasonic sensor device is mounted on the exterior panelling part or on the door panel, the securing apparatus can firstly be arranged on the inner side of the exterior panelling part. For example, the securing apparatus can be bonded to the inner side of the exterior panelling part. The cover apparatus has a receptacle into which the ultrasonic sensor can be introduced. In this context, the ultrasonic sensor can be introduced into the receptacle in such a way that a rear side of the ultrasonic sensor which lies opposite the diaphragm is secured in the receptacle. The rear side of the ultrasonic sensor can be assigned, for example, to a housing of the ultrasonic sensor. Therefore, the ultrasonic sensor can firstly be connected to the cover apparatus. The cover apparatus which holds the ultrasonic sensor can subsequently be connected in a positively locking fashion to the securing apparatus. The securing apparatus has a corresponding opening or passage opening in which the diaphragm is arranged. The diaphragm is preferably arranged in the opening in such a way that it is pressed against the inner side of the exterior panelling part by means of the prestressing force. The attachment device which has the securing apparatus and the cover apparatus can significantly simplify the mounting of the ultrasonic sensor on the exterior panelling part.

The cover apparatus preferably has at least one spring element for making available the prestressing force. The at least one spring element can be formed by a part or a region of the cover apparatus. The at least one spring element can be embodied in an elastically deformable fashion. The at least one spring element serves, in particular, to apply the prestressing force to the ultrasonic sensor in such a way that when the cover apparatus and the securing apparatus are connected the diaphragm is pressed onto the inner side of the exterior panelling part with the prestressing force. Therefore, it is possible to make available the prestressing force in an easy way by means of the at least one spring element. It is also possible to provide that the cover apparatus has a plurality of spring elements.

According to a further embodiment, the ultrasonic sensor has a housing, wherein the housing has at least one elevated portion onto which the at least one spring element presses. The ultrasonic sensor can have a housing which is formed, for example, from a plastic. The housing can at least partially surround the pot-shaped diaphragm. The electronics of the ultrasonic sensor and the piezo-electric element can be arranged inside the housing. At least one elevated portion or a latching projection against which the at least one spring element presses can be provided on an outer side of the housing. In this context, the at least one spring element and the elevated portion can be embodied in such a way that the prestressing force is pressed in the direction of the transmission direction of the ultrasonic sensor in which the ultrasonic signal is also emitted. In particular, the prestressing force can act in such a way that it presses essentially perpendicularly with respect to a surface of the inner side of the exterior panelling part and/or essentially perpendicularly with respect to the base surface of the diaphragm.

Furthermore, it is advantageous if the receptacle of the cover apparatus has at least one clamp element, which, in order to secure the rear side of the ultrasonic sensor, is connected in a positively locking fashion to a corresponding clamping region of the housing. Within the receptacle, the cover apparatus can have corresponding webs between which an elevated portion or a projection which is arranged on the outer side of the housing can be clamped. The connection between the at least one clamp element and the clamping region can also be frictionally locking. The at least one clamp element and the corresponding clamping region of the housing can be embodied in such a way that the ultrasonic sensor can be moved relative to the cover apparatus in the transmission direction. In addition, the at least one clamp element and the corresponding clamping region can be configured in such a way that a movement in a direction which is different from the transmission direction and/or a rotational movement are not made possible. As a result of the at least one clamp element and the corresponding clamping region, the ultrasonic sensor can be moved in the direction of the cover apparatus after the connection of the securing apparatus and the cover apparatus, and at the same time can be supported by the at least one spring element. The at least one spring element can be deflected by the housing of the ultrasonic sensor after the connection of the cover apparatus and the securing apparatus, as a result of which the prestressing force is applied to the ultrasonic sensor by means of the at least one spring element, and the ultrasonic sensor or the diaphragm of the ultrasonic sensor is pressed against the inner side of the exterior panelling part.

In one embodiment, the cover apparatus has a multiplicity of latching hooks which are each connected in a positively locking fashion to a corresponding elevated portion of the securing apparatus by means of a snap-action connection. In other words, the cover apparatus and the securing apparatus can be connected to one another in a latching fashion. When the cover apparatus is connected to the securing apparatus or when the cover apparatus is moved in the direction of the securing apparatus, the latching hooks can be deformed elastically. If the latching hooks are pushed away over the corresponding elevated portion of the securing apparatus, they can be connected in a latching fashion to the elevated portion. It is therefore easily possible to make available a positively locking connection between the cover apparatus and the securing apparatus.

The latching hooks are preferably arranged one next to the other in a circumferential direction of the cover apparatus and the elevated portion of the securing apparatus is embodied running around in a circumferential direction of the securing apparatus. The cover apparatus can have, for example, an essentially round cross-sectional surface. The individual latching hooks are therefore arranged one next to the other in the circumferential direction. The elevated portion of the securing apparatus can also be embodied running around in the circumferential direction of the securing apparatus. A snap-action connection or latching connection can therefore be made available between the cover apparatus and the securing apparatus, which connection permits a securing force along the entire circumferential direction of the securing apparatus and the entire circumferential direction of the cover apparatus. A reliable connection can therefore be made available between the cover apparatus and the securing apparatus.

The securing apparatus has preferably a multiplicity of elastically deformable support elements which can each be arranged on the inner side of the exterior panelling part. The securing apparatus or the region of the securing apparatus which is connected to the inner side of the exterior panelling part can be divided into a plurality of regions or support elements. These support elements can be embodied in an elastically deformable fashion. It is therefore possible to ensure, for example, that the individual support elements can be adapted to the shape of the exterior panelling part. A corresponding adhesive can be applied to the respective regions of the support elements which are assigned to the inner side of the exterior panelling part. A reliable connection can therefore be made available between the securing apparatus and the exterior panelling part.

A panelling arrangement according to the invention for a motor vehicle comprises an ultrasonic sensor device according to the invention and an exterior panelling part.

The ultrasonic sensor is preferably configured to emit the ultrasonic signal through the exterior panelling part and/or to receive the ultrasonic signal through the exterior panelling part. The diaphragm of the ultrasonic sensor is preferably connected in a materially joined fashion to the exterior panelling part. If the diaphragm of the ultrasonic sensor is excited to undergo mechanical oscillations in order to emit the ultrasonic signal, the exterior panelling part is also excited to undergo mechanical oscillations. The ultrasonic signal can therefore be transmitted through the exterior panelling part. If the emitted ultrasonic signal is reflected by an object in the surroundings of the motor vehicle, it impinges again on the exterior panelling part, as a result of which the exterior panelling part is excited to undergo mechanical oscillations. The diaphragm, which is connected in a materially joined fashion into the exterior panelling part, is also excited to undergo mechanical oscillations. The ultrasonic signal can therefore be received as it were through the exterior panelling part.

The securing apparatus is preferably connected to the inner side of the exterior panelling part by means of a bonded connection. It is therefore possible to apply an adhesive, for example, to the respective support elements of the securing apparatus, and for said adhesive to be placed in contact with the inner side of the exterior panelling part. The adhesive can be applied, for example, as a liquid adhesive or a bonding pad. A materially joined connection can therefore be easily formed between the securing apparatus and the exterior panelling part.

Furthermore, it is advantageous if the diaphragm of the ultrasonic sensor is connected to the inner side of the exterior panelling part by means of a bonding element. In this context, the diaphragm and the exterior panelling part can be bonded to one another in such a way that the outer transmission surface or the base surface of the diaphragm is arranged essentially parallel to the inner side of the exterior panelling part. For example a bonding pad can be used as the bonding element. As a result of the prestressing force which is made available with the at least one spring element, the diaphragm is pressed against the inner side of the exterior panelling part during the curing of the adhesive. A reliable, materially joined connection can therefore be made available between the diaphragm and the exterior panelling part.

The exterior panelling part is preferably part of a door of the motor vehicle. The exterior panelling part can be, for example, a corresponding door panel. A corresponding cutout in which the ultrasonic sensor device is arranged can be provided within the door.

A motor vehicle according to the invention comprises at least one panelling arrangement according to the invention. The motor vehicle can be embodied, in particular, as a passenger car. The motor vehicle can have a driver assistance system which is embodied, for example, as a door opening assistant.

A method according to the invention serves for mounting an ultrasonic sensor device on an exterior panelling part of a motor vehicle. In this context, an ultrasonic sensor which has a diaphragm for emitting and/or for receiving an ultrasonic signal is connected to an exterior panelling part of the motor vehicle by means of an attachment device. In this context, in a correct installation position of the ultrasonic sensor device on the exterior panelling part the diaphragm is pressed with a prestressing force against an inner side of the exterior panelling part by means of the attachment device. In addition, a securing apparatus of the attachment device is arranged on the inner side of the exterior panelling part. The ultrasonic sensor is finally arranged in a cover apparatus of the attachment device in such a way that a rear side, lying opposite the diaphragm, of the ultrasonic sensor is secured in a receptacle of the cover apparatus. Ultimately, the cover and the securing apparatus are connected in a positively locking fashion in such a way that the diaphragm is arranged in an opening in the securing apparatus.

As a result of the method, the ultrasonic sensor device or the ultrasonic sensor can be attached to the exterior panelling part more simply and quickly. In particular, a working step can be eliminated compared to known mounting methods.

The preferred embodiments which are presented with respect to the ultrasonic sensor device according to the invention and the advantages thereof apply correspondingly to the panelling arrangement according to the invention, the motor vehicle according to the invention and the method according to the invention.

Further features of the invention can be found in the claims, the figures and the description of the figures. The features and combinations of features mentioned below in the description and the features and combinations of features mentioned below in the description of the figures and/or only shown in the figures can be used not only in the respectively specified combination but also in other combinations or alone without departing from the scope of the invention. Embodiments of the invention which are not explicitly shown in the figures or explained, but are apparent and can be generated on the basis of the explained embodiments by means of separate combinations of features are therefore also to be considered as being included and disclosed. Embodiments and combinations of features which therefore do not have all the features of an originally formulated independent claim are therefore also to be considered as disclosed.

The invention will now be explained in more detail on the basis of preferred exemplary embodiments and with reference to the appended drawings, in which.

In the figures, identical and functionally identical elements are provided with same reference symbols.

Figure 1:
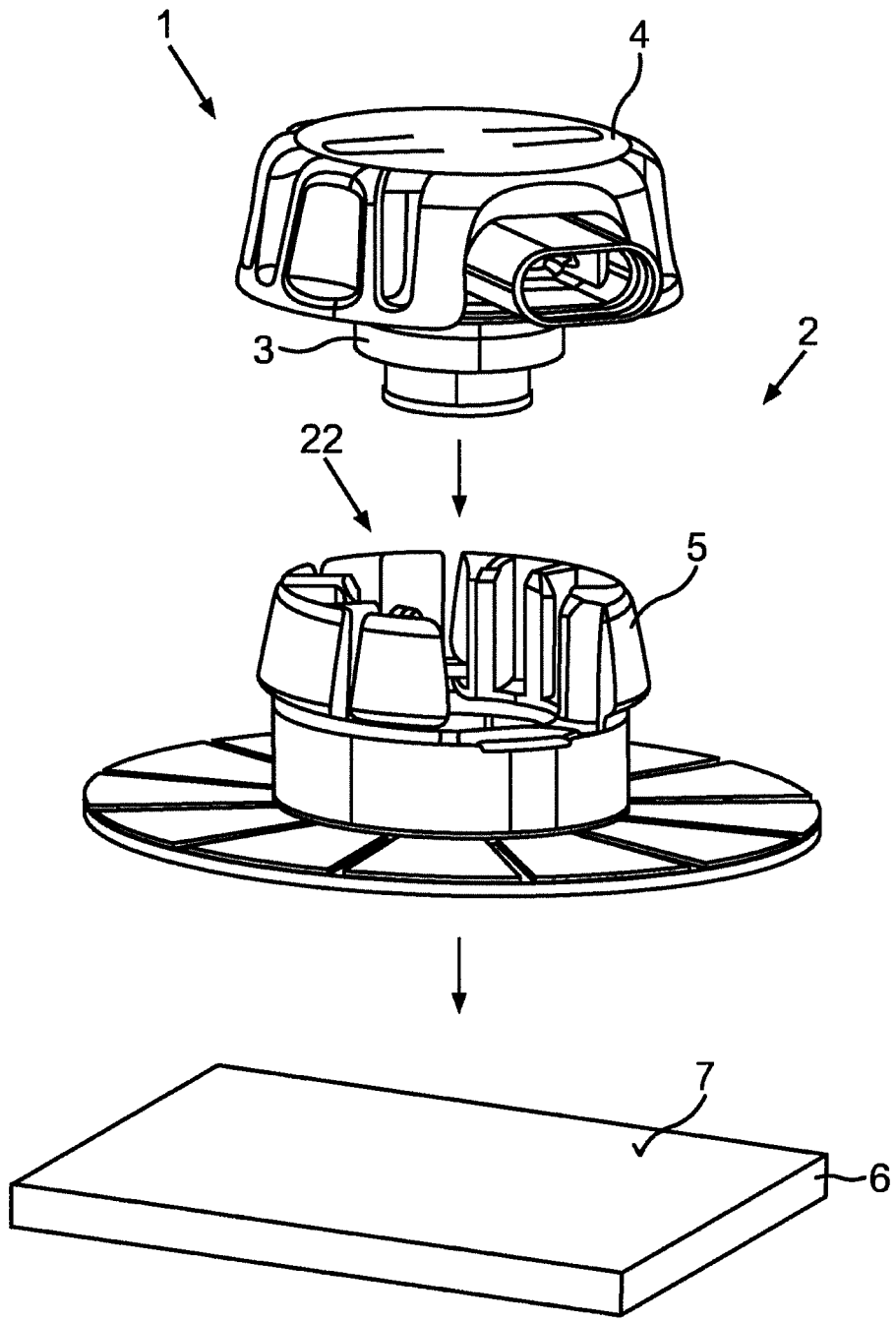
FIG. 1 shows a panelling arrangement which has an ultrasonic sensor device and an exterior panelling part of a motor vehicle, in an exploded illustration.

FIG. 1 shows a panelling arrangement 1 in an exploded illustration. The panelling arrangement 1 comprises an ultrasonic sensor device 2. The ultrasonic sensor device 2 comprises in turn an ultrasonic sensor 3. The ultrasonic sensor 3 serves to emit and/or receive an ultrasonic signal. The ultrasonic sensor 3 is arranged in a cover apparatus 4. The ultrasonic sensor device 1 additionally comprises a securing apparatus 5 which can be connected to an exterior panelling part 6 of a motor vehicle. The cover apparatus 4 and the securing apparatus 5 together form an attachment device. The exterior panelling part 6 can be, in particular, a door panel of the motor vehicle. In this context, the securing apparatus 5 can be connected to an inner side 7 of the exterior panelling part 6. The inner side 7 is located on a side lying opposite an outer side of the exterior panelling part 6. The outer side of the exterior panelling part 6 is visible from the outside to a viewer who is standing in front of the motor vehicle.

Figure 2:
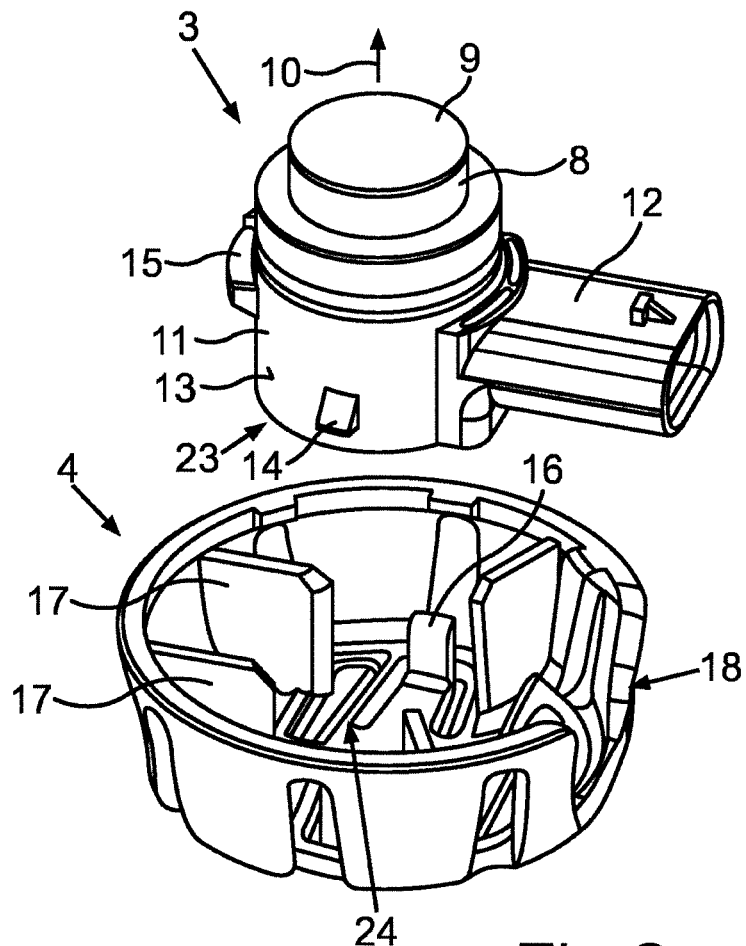
FIG. 2 shows a cover apparatus and an ultrasonic sensor of the ultrasonic sensor device in a perspective view.

FIG. 2 shows the ultrasonic sensor 3 and the attachment apparatus 4 in a perspective view. In this context it is apparent that the ultrasonic sensor 3 has a diaphragm 8. The diaphragm 8 is embodied in a pot-shaped fashion in the present exemplary embodiment, and can be formed, for example, from aluminium. A bonding element 9 is arranged on an emission surface or base surface of the diaphragm 8. The diaphragm 8 can be attached to the inner side 7 of the exterior panelling part 6 with this bonding element 9, which is embodied, for example, as a bonding pad. In order to emit the ultrasonic signal, the diaphragm 8 or the emission surface of the diaphragm 8 can be excited to undergo mechanical oscillations by means of a piezo-electric element. In this context, the arrow 10 characterizes the transmission direction or main emission direction of the ultrasonic sensor 3. Ultrasonic signals which are reflected by an object can also be received by means of the diaphragm 8.

The ultrasonic sensor 3 additionally comprises a housing 11, which can be formed, for example, from a plastic. In this context, the diaphragm 8 can be arranged at least partially within the housing 11. The housing 11 additionally comprises a plug section 12, through which corresponding electrical leads for making contact with the ultrasonic sensor 3 or the electronics of the ultrasonic sensor 3 can be guided. In addition, at least one elevated portion 14 is arranged on an outer side 13 of the housing 11. In addition, a clamping region 15 in the form of a further elevated portion is arranged on the outer side 13 of the housing 11.

The attachment apparatus 4 can be formed, for example, from a plastic. The attachment apparatus 4 has a receptacle 24 for the ultrasonic sensor 3. A rear side 23, which is assigned to the housing 11, can be introduced into the receptacle 24. The attachment apparatus 4 comprises at least one spring element 16 which can press on the elevated portions 14 of the ultrasonic sensor 3. Furthermore, the attachment apparatus 4 comprises at least one clamping element 17. In the present exemplary embodiment, the attachment apparatus 4 has two clamping elements 17, which are embodied in a way corresponding to the clamping region 15 of the housing 11 of the ultrasonic sensor 3. In addition, the attachment apparatus 4 has a cutout 18 for the plug region 12.

Figure 3:
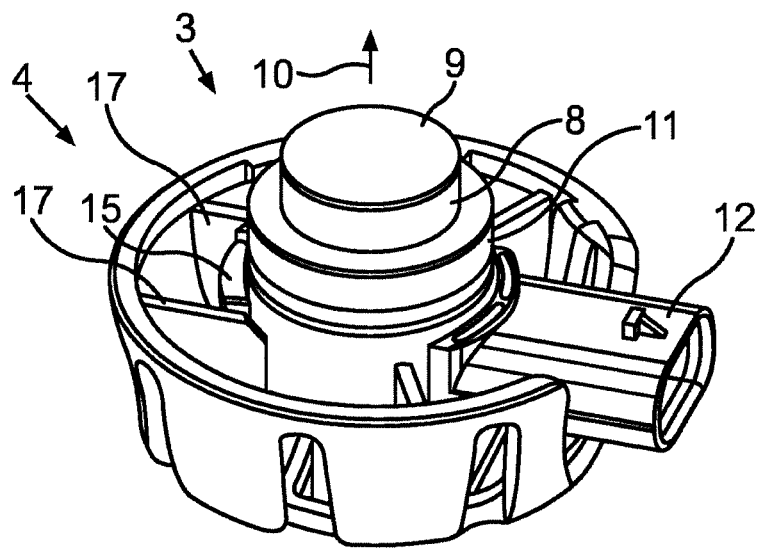
FIG. 3 shows the ultrasonic sensor and the cover apparatus according to FIG. 2, wherein the ultrasonic sensor is secured in the cover apparatus.

FIG. 3 shows the ultrasonic sensor 3 which is arranged in the attachment apparatus 4 or in the receptacle 24. It is apparent here that the clamping region 15 of the ultrasonic sensor 3 is clamped between the clamping elements 17 of the attachment apparatus 4. A friction locking connection is therefore made available between the clamping region 15 and the clamping elements 17. This connection also makes it possible for the ultrasonic sensor 3 to be able to be moved relative to the attachment apparatus 4, in the transmission direction 10.

Figure 4:
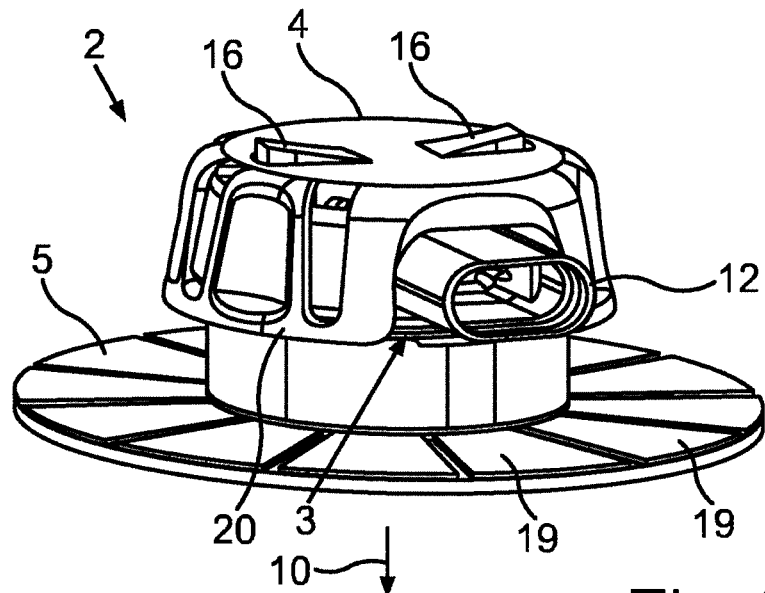
FIG. 4 shows the ultrasonic sensor device in a perspective view, wherein the ultrasonic sensor which is secured in the cover apparatus is connected to the securing apparatus.

FIG. 4 shows the ultrasonic sensor device 2 in a perspective view. In this context, the attachment apparatus 4 in which the ultrasonic sensor 3 is arranged is connected to the securing apparatus 5. On the upper side of the attachment apparatus 4, the two spring elements 16 are apparent, which spring elements 16 press against the ultrasonic sensor 3 and therefore bring about a prestressing force in the direction of the transmission direction (arrow 10). In addition, it is apparent that the securing apparatus 5 has a multiplicity of support elements 19 which are embodied, for example, in an elastically deformable fashion. The support elements 19 can be connected to the inner side 7 of the exterior panelling part 6, for example with an adhesive.

Figure 5:
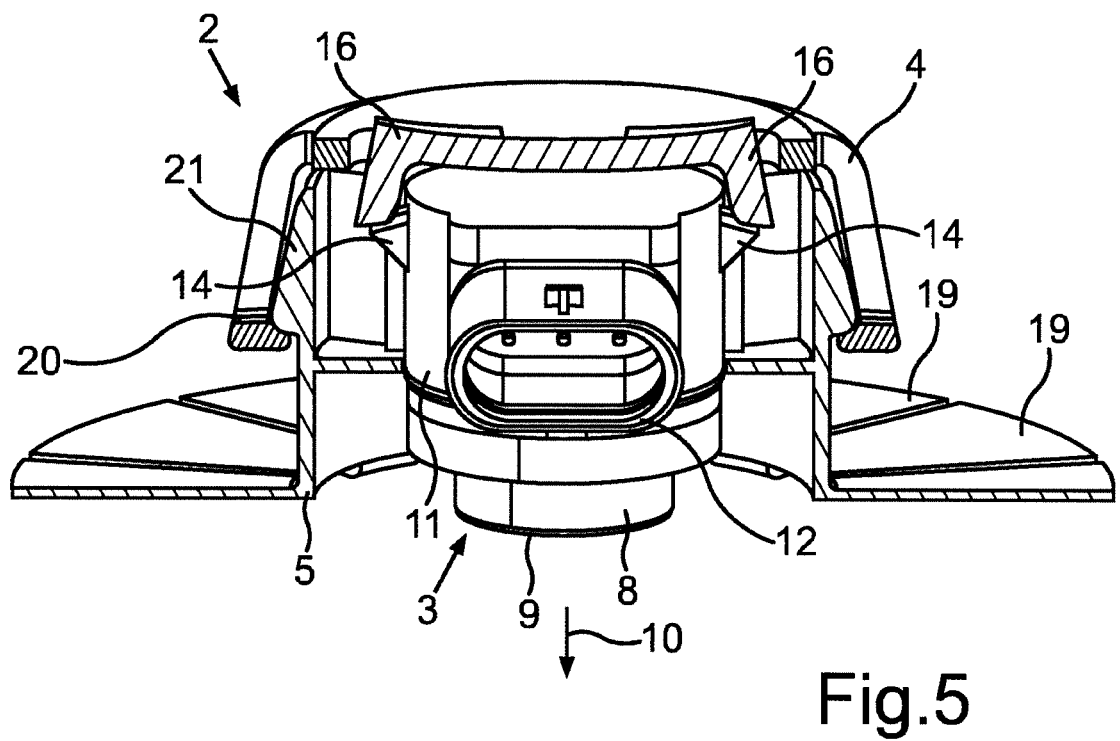
FIG. 5 shows the ultrasonic sensor device according to FIG. 4, wherein the cover apparatus and the securing apparatus are illustrated in section.

FIG. 5 shows the ultrasonic sensor device 2 according to FIG. 4, wherein the cover apparatus 4 and the securing apparatus 5 are illustrated in section. It is apparent here that the cover apparatus 4 has a multiplicity of latching hooks 20 which are arranged one next to the other in a circumferential direction of the attachment apparatus 4. These latching hooks engage in an elevated portion 21, embodied running around, of the securing apparatus 5. The attachment apparatus 4 and the securing apparatus 5 can therefore be connected to one another by means of a snap-action connection or latching connection. In addition it is apparent that in the connected state of the attachment apparatus 4 and the securing apparatus 3 the spring elements 16 are elastically deformed and therefore exert the prestressing force on the elevated portions 14 and therefore on the ultrasonic sensor 3. This ensures that the diaphragm 8 or the adhesive pad 9 is pressed onto the inner side 7 of the exterior panelling part. In this context, a reliable bonded connection can be made available between the diaphragm 8 and the exterior panelling part 6.

When the ultrasonic sensor device 2 is mounted on the exterior panelling part 6, the securing apparatus 5 or the individual rear sides of the support surfaces 19 can firstly be bonded onto the inner side 7 of the exterior panelling part 6. Subsequently, the ultrasonic sensor 3 can be connected to the cover apparatus 4. In this context, the ultrasonic sensor 3 is secured in the attachment apparatus 4 by means of the connection of the clamping region 15 and of the clamping elements 17. Subsequently, the unit composed of the ultrasonic sensor 3 and attachment apparatus 4 can be connected to the securing apparatus 5. In this context, the attachment apparatus 4 can be pressed onto the securing apparatus 5 in the direction of the arrow 10. In this context, the latching hooks 20 are elastically deformed until they latch in on the elevated portion 21. In this context, the prestressing force is exerted on the diaphragm 8 or the clamping element 9 by the spring element 16 until the adhesive of the bonding element 9 is cured. In this way, simplified mounting of the ultrasonic sensor device 2 on the exterior panelling part 6 or the door panel can be made possible.

The invention claimed is:

1. An ultrasonic sensor device for a motor vehicle, comprising:
    an ultrasonic sensor which comprises a diaphragm for emitting and/or receiving an ultrasonic signal; and
    an attachment device which is configured, in a correct installation position of the ultrasonic sensor device on an exterior panelling part of the motor vehicle, to press the diaphragm against an inner side of the exterior panelling part with a prestressing force, wherein the attachment device comprises a securing apparatus and a cover apparatus, wherein the securing apparatus is arranged on the inner side of the exterior panelling part and comprises an opening in which the diaphragm is arranged, wherein the cover apparatus comprises a receptacle in which a rear side, lying opposite the diaphragm, of the ultrasonic sensor is secured, wherein the cover apparatus and the securing apparatus are connected in a positively locking fashion, wherein the securing apparatus engages a front side of the attachment device and the cover apparatus engages the rear side of the attachment device, the front side being opposite to the rear side, wherein the ultrasonic sensor further comprises at least one elevated projection disposed on an outer side of the ultrasonic sensor, wherein the outer side of the ultrasonic sensor is disposed between the diaphragm and the rear side of the ultrasonic sensor, and wherein the cover apparatus comprises at least one spring element which applies the prestressing force to the at least one elevated projection.

2. The ultrasonic sensor device according to claim 1, wherein the receptacle of the cover apparatus comprises at least one clamp element, which, in order to secure the rear side of the ultrasonic sensor, is connected in a positively locking fashion to a corresponding clamping region of the housing.

3. The ultrasonic sensor device according to claim 1, wherein the cover apparatus comprises a multiplicity of latching hooks which are each connected in a positively locking fashion to a corresponding elevated portion of the securing apparatus by means of a snap-action connection.

4. The ultrasonic sensor device according to claim 3, wherein the latching hooks are arranged one next to the other in a circumferential direction of the cover apparatus and the elevated portion of the securing apparatus is embodied running around in a circumferential direction of the securing apparatus.

5. The ultrasonic sensor device according to claim 1, wherein the securing apparatus comprises a multiplicity of elastically deformable support elements which can each be arranged on the inner side of the exterior panelling part.

6. A panelling arrangement for a motor vehicle comprising:
the ultrasonic sensor device according to claim 1; and
an exterior panelling part.

7. The panelling arrangement according to claim 6, wherein the ultrasonic sensor is configured to emit the ultrasonic signal through the exterior panelling part and/or to receive the ultrasonic signal through the exterior panelling part.

8. The panelling arrangement according to claim 6, wherein the securing apparatus is connected to the inner side of the exterior panelling part by means of a bonded connection.

9. The panelling arrangement according to claim 6, wherein the diaphragm of the ultrasonic sensor is connected to the inner side of the exterior panelling part by a bonding element.

10. The panelling arrangement according to claim 6, wherein the exterior panelling part is part of a door of the motor vehicle.

11. A motor vehicle comprising at least one panelling arrangement according to claim 6.

12. A method for mounting an ultrasonic sensor device on an exterior panelling part of a motor vehicle, the method comprising:
connecting an ultrasonic sensor which comprises a diaphragm for emitting and/or receiving an ultrasonic signal to the exterior panelling part of the motor vehicle by an attachment device, wherein in a correct installation position of the ultrasonic sensor device on the exterior panelling part the diaphragm is pressed with a prestressing force against an inner side of the exterior panelling part by the attachment device; and arranging a securing apparatus of the attachment device on the inner side of the exterior panelling part, wherein the ultrasonic sensor is arranged in a cover apparatus of the attachment device so that a rear side, lying opposite the diaphragm, of the ultrasonic sensor is secured in a receptacle of the cover apparatus, connecting the cover apparatus and the securing apparatus in a positively locking fashion so that the diaphragm is arranged in an opening in the securing apparatus, wherein the securing apparatus engages a front side of the attachment device and the cover apparatus engages the rear side of the attachment device, the front side being opposite to the rear side, wherein the ultrasonic sensor further comprises at least one elevated projection disposed on an outer side of the ultrasonic sensor, wherein the outer side of the ultrasonic sensor is disposed between the diaphragm and the rear side of the ultrasonic sensor, and wherein the cover apparatus comprises at least one spring element which applies the prestressing force to the at least one elevated projection.

* * * * *